United States Patent
Ohtsu et al.

(10) Patent No.: US 7,809,228 B2
(45) Date of Patent: Oct. 5, 2010

(54) OPTICAL WAVEGUIDE FILM, METHOD FOR MANUFACTURING THE SAME, AND OPTICAL TRANSMISSION AND RECEPTION MODULE

(75) Inventors: Shigemi Ohtsu, Kanagawa (JP);
Toshihiko Suzuki, Kanagawa (JP);
Masahiro Igusa, Kanagawa (JP);
Kazutoshi Yatsuda, Kanagawa (JP);
Akira Fujii, Kanagawa (JP); Keishi Shimizu, Kanagawa (JP); Eiichi Akutsu, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 12/183,834

(22) Filed: Jul. 31, 2008

(65) Prior Publication Data
US 2009/0103858 A1    Apr. 23, 2009

(30) Foreign Application Priority Data
Oct. 23, 2007    (JP) .............................. 2007-275507

(51) Int. Cl.
*G02B 6/10* (2006.01)
(52) U.S. Cl. ....................................... 385/129; 385/101
(58) Field of Classification Search .................. None
See application file for complete search history.

(56) References Cited

U.S. PATENT DOCUMENTS

| 7,343,060 | B2 * | 3/2008 | Ohtsu et al. ................... 385/14 |
| 7,542,647 | B2 * | 6/2009 | Ohtsu et al. .................. 385/130 |
| 2002/0181882 | A1 * | 12/2002 | Hibbs-Brenner et al. ....... 385/52 |
| 2003/0039455 | A1 * | 2/2003 | Ouchi .......................... 385/88 |
| 2005/0201693 | A1 * | 9/2005 | Korenaga et al. ............. 385/89 |
| 2007/0183719 | A1 * | 8/2007 | Lee et al. ....................... 385/47 |
| 2008/0226222 | A1 * | 9/2008 | Kim et al. ..................... 385/14 |
| 2009/0067779 | A1 * | 3/2009 | Furuyama .................... 385/14 |
| 2009/0067796 | A1 * | 3/2009 | Fujii et al. .................. 385/129 |
| 2009/0092353 | A1 * | 4/2009 | Chan et al. .................... 385/14 |
| 2009/0190880 | A1 * | 7/2009 | Hikita et al. .................. 385/14 |

FOREIGN PATENT DOCUMENTS

| JP | 6-222236 A | 8/1994 |
| JP | 6-281831 A | 10/1994 |
| JP | 2001-311846 A | 11/2001 |
| JP | 2002-333537 A | 11/2002 |

\* cited by examiner

*Primary Examiner*—Sung H Pak
(74) *Attorney, Agent, or Firm*—Sughrue Mion, PLLC (57) ABSTRACT

An optical waveguide film includes an optical waveguide film main body having an optical waveguide core through which light is propagated, and a cladding portion that encloses the optical waveguide core and has a lower refractive index than that of the optical waveguide core; and an electric wiring layer formed on at least a part of a principal surface of the optical waveguide film main body.

23 Claims, 10 Drawing Sheets

OPTICAL WAVEGUIDE FILM, METHOD FOR MANUFACTURING THE SAME, AND OPTICAL TRANSMISSION AND RECEPTION MODULE

CROSS-REFERENCE TO RELATED APPLICATION

This application is based on and claims priority under 35 USC 119 from Japanese Patent Application No. 2007-275507 filed on Oct. 23, 2007.

BACKGROUND

1. Technical Field

The present invention relates to an optical waveguide film, a method for manufacturing the same, and an optical transmission and reception module.

2. Related Art

Flexible electric wiring circuits have been generally used in variety of ways. However, accompanied by demand for high-speed signal processing techniques, signal transmission on the order of gigahertz (GHz) has been required. Hence, with regard to signal transmission on the order of gigahertz, a photo-electric combined substrate using optical communication so as to address noise problems has been studied.

SUMMARY

According to an aspect of the invention, there is provided an optical waveguide film including:

an optical waveguide film main body having an optical waveguide core through which light is propagated, and a cladding portion that encloses the optical waveguide core and has a lower refractive index than that of the optical waveguide core; and an electric wiring layer formed on at least a part of a principal surface of the optical waveguide film main body.

BRIEF DESCRIPTION OF THE DRAWINGS

Exemplary embodiments of the present invention will be described in detail based on the following figures, wherein.

DETAILED DESCRIPTION

Exemplary embodiments of the present invention will be hereinafter described with reference to the attached drawings. Note that the same reference character is assigned to members having substantially the same function and operation throughout the drawings, and overlapping descriptions may be omitted.

Optical Waveguide Film

Figure 1A:
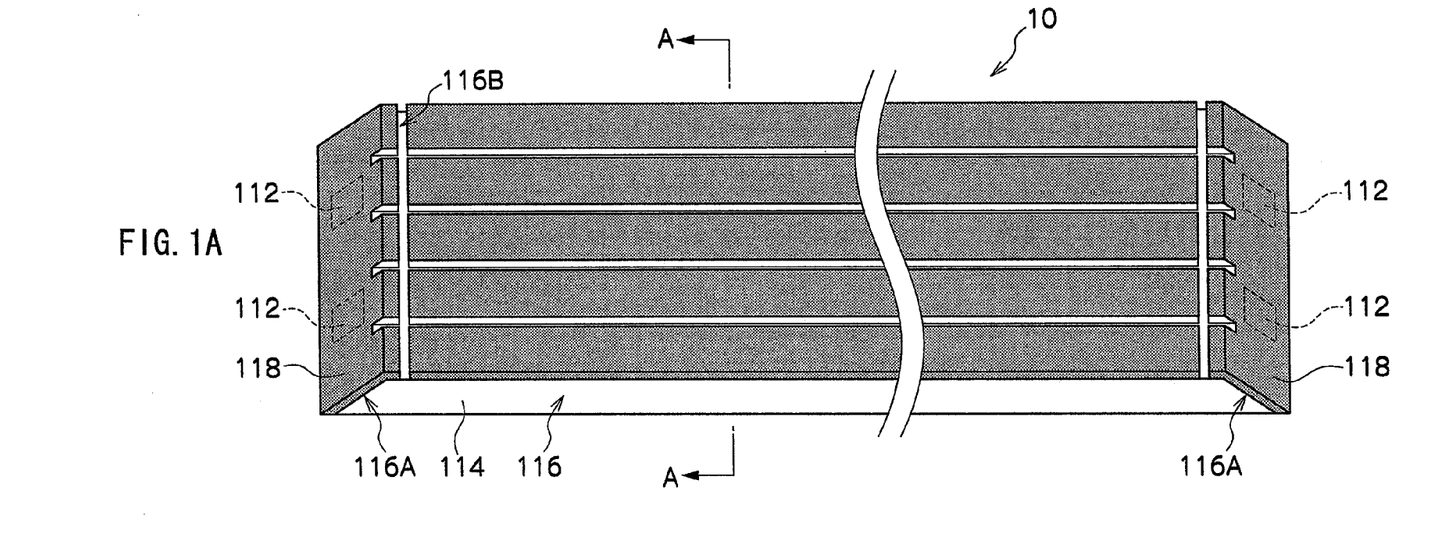
FIG. 1A is a schematic perspective structural diagram showing an optical waveguide film according to an exemplary embodiment of the present invention.
Figure 1B:
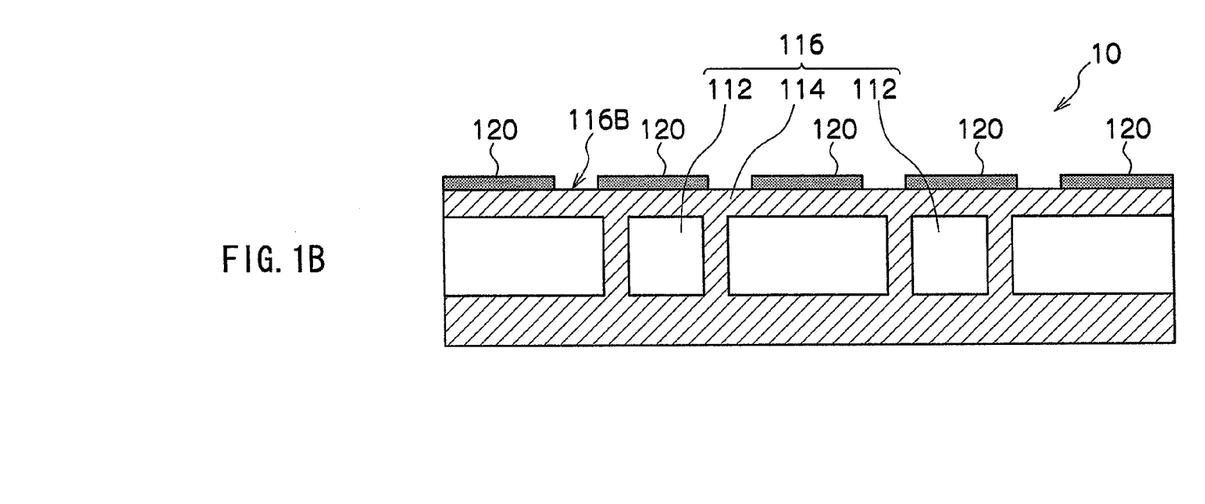
FIG. 1B is a schematic structural diagram showing a cross section of an optical waveguide film according to an exemplary embodiment of the present invention taken along line A-A.
Figure 2A:
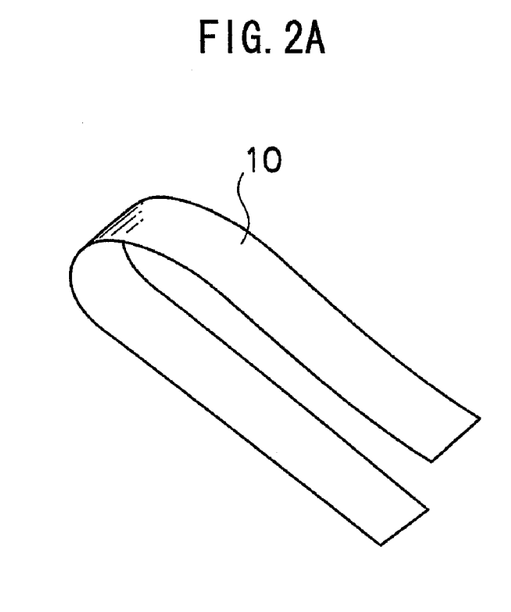
FIGS. 2A and 2B are perspective views showing that an optical waveguide film according to an exemplary embodiment of the present invention has flexibility (bending property) when deformed.
Figure 2B:
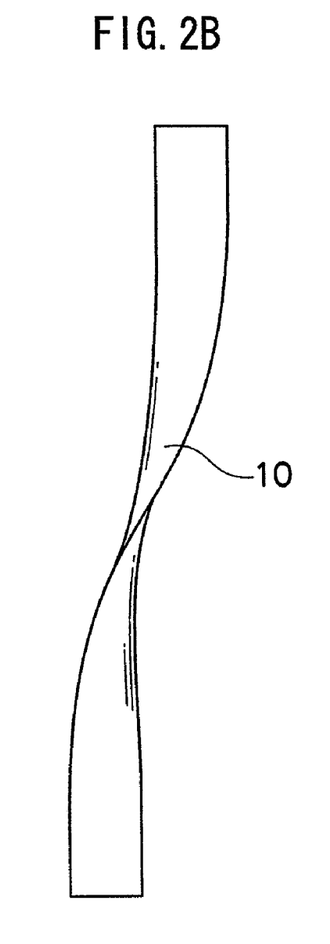

FIGS. 1A and 1B are schematic structural diagrams showing an optical waveguide film according to an exemplary embodiment of the present invention. FIG. 1A is a perspective view, and FIG. 1B is a cross sectional view taken along line A-A indicated in FIG. 1A. FIGS. 2A and 2B are perspective views each showing the state in which the optical waveguide film according to an exemplary embodiment of the present invention has flexibility (bending property) when deformed.

The optical waveguide film 10 according to an exemplary embodiment of the present invention is, for example, a belt-shaped optical waveguide as shown in FIGS. 1A and 1B, and includes an optical waveguide film main body 116 having a cladding 114 and an optical waveguide core 112 enclosed by the cladding 114. Further, the optical waveguide film main body 116 has mirror surfaces 116A (slanted surfaces) at both longitudinal-direction end portions thereof. Each of the mirror surfaces 116A serves as an optical path diverting portion at which the optical path of the light propagated through the optical waveguide cores 112 is diverted. A mirror layer 118 is provided on the mirror surface 116A. An electric wiring layer 120 is provided on one principal surface 116B of the two principal surfaces of the optical waveguide film main body 116. Incidentally, the "principal surface" mentioned herein means a surface perpendicular to the film thickness direction.

The refractive index of the optical waveguide core 112 is made higher than that of the cladding 114. For example, assuming that, by way of example, the difference in the refractive index between the optical waveguide core 112 and the cladding 114 is 3%, an optical waveguide film may be obtained which has almost no bending loss until the optical waveguide file is bent to a curvature radius of 1.5 mm. A greater difference in the refractive index enables a smaller bending radius without causing bending loss. In view of a mechanical bending property of the optical waveguide film, connection loss caused by connection to an optical transmission and reception elements, and the like, the difference in the refractive index may be in the range of from 2% to 5%. If the difference in the refractive index is in the range of from 3% to 4%, even if the optical waveguide film is bent at the bending radius of 1 mm, optical loss at the time of practical bending becomes very small, and connection with the optical transmission and reception elements is also easy, which is preferable from the practical viewpoint.

Plural optical waveguide cores 112 are provided on the same plane and arranged in parallel so that optical rays separated in the widthwise direction of the optical waveguide film 10 are propagated in parallel. In the present exemplary embodiment, two optical waveguide cores 112 are disposed. The mirror surfaces 116A are provided at the longitudinal-direction end portions of the optical waveguide cores 112, and each mirror surface 116A makes an angle with the longitudinal direction. The mirror surface 116A is configured to form an angle of, for example, 45 degrees with the longitudinal direction of the optical waveguide core 112. When light propagated through the optical waveguide core 112 arrives at the mirror surface 116A, it is reflected by a layer adjacent to the mirror surface 116A (in the present exemplary embodiment, by a mirror layer 118), so that the propagation direction of the light is changed. Although the angle of the mirror surface is described herein as 45 degrees, satisfactory diversion of the optical path via a metal reflecting surface may be performed as long as the difference between the actual angle and 45 degrees is less than the critical angle of the waveguide. For example, when the difference in the refractive index between the waveguide core and the cladding is 3%, the critical angle is 23.6 degrees, and a mirror surface at an angle within the range of from 21.4 to 68.6 degrees functions as a reflecting surface having a function of diverting the optical path by 90 degrees.

Incidentally, when the optical waveguide film 10 is coated with a flame retardant resin as described below, the flame retardant resin enters a space between the optical transmission and reception element and the optical waveguide film through a canaliculus phenomenon, and the amount of light decreases due to absorption by the flame retardant resin. However, when the optical transmission and reception element and the optical waveguide are adhered to each other by filling a transparent material therebetween and the mirror layer 118 (metal layer) is provided on the mirror surface 116A, intrusion of the flame retardant resin may be avoided, and reduction in the amount of light propagated through the optical waveguide film may be avoided.

The cladding 114 is made of a material having a lower refractive index than that of the optical waveguide core 112, and is disposed to surround the optical waveguide core 112.

The materials of the optical waveguide core 112 and the cladding 114 are not particularly limited as long as the materials are transparent to the wavelength to be used for the optical waveguide film 10 and there is a desired difference in the refractive index between the optical waveguide core 112 and the cladding 14. Examples thereof include alicyclic olefin resins, acrylic resins, epoxy resins, and polyimide resins.

When the optical waveguide film 10 is coated with a flame retardant resin as described below, in order to realize excellent adhesion to the frame retardant resin layer, it is possible to use an acrylic resin or an epoxy resin as the material of the cladding 114 at least in a region that comes into contact with the flame retardant resin layer.

The electric wiring layer 120 is disposed to extend along the longitudinal direction of the optical waveguide film main body 116 from one end to the other end thereof. In the present exemplary embodiment, the electric wiring layer 120 is divided into five strips. The five strips are disposed in parallel at predetermined intervals and separated in the widthwise direction of the optical waveguide film main body 116. These five strips of the electric wiring layer 120 function, for example, as one power source line, two signal lines and two grounding wires.

The electric wiring layer 120 is, for example, formed from the same kind of metal layer as that of the mirror layer 118. The metal layer may include Au, Ag, Cu or an alloy thereof. Further, the electric wiring layer 120 and the mirror layer 118 each may be a metal layer having a thickness of from 500 nm to 5 µm, preferably from 500 nm to 2 µm. Here, the metal layer that constitutes the electric wiring layer 120 is required to have, for example, conductivity and adhesiveness between the metal film and the optical waveguide film main body 116, which is required for electric wiring by wire bonding. Hence, the film thickness of the metal film required for wire bonding may be 300 nm or greater, and conductivity required for electric wiring may be 500 nm or greater when using an Ag alloy, for example. For this reason, when a metal layer of Au, Ag, Cu or an alloy thereof is used as the electric wiring layer, the thickness thereof may be within the aforementioned range. Further, when the metal layer (electric wiring layer) has such a thickness, the electric wiring layer may also be used as the mirror layer 118, which is preferable from the practical viewpoint and realizes reduction in the cost.

The optical waveguide film 10 includes a flexible transparent resin film. As shown in FIGS. 2A and 2B, it shows flexibility (high bending property) when deformed such as "bent" or "twisted" even if it has the electric wiring layer 120 (and/or is coated with a flame retardant resin described later). For this reason, even when the film is deformed, an optical signal transmitted from an optical transmission and reception section is transmitted by an optical waveguide formed in the optical waveguide film 10, and is received by another optical transmission and reception section. The optical waveguide film 10 may have such a flexibility as to achieve a minimum bending radius of not more than 3 mm. The minimum bending radius is a value that is determined by bending the optical waveguide film 10, approximating a very small portion of a curved line formed at the inner side of the optical waveguide film 10 to a circle, and obtaining the minimum radius of the circle and taking it as the minimum bending radius. Its allowable value is measured according to a standard, ASTM D-2176.

The optical waveguide film 10 preferably has a thickness of from 50 µm to 500 µm, and more preferably from 50 µm to 200 µm. The width of the optical waveguide film 10 is preferably from 0.2 mm to 10 mm, and more preferably from 0.25 mm to 5 mm.

A description will be given of a method for manufacturing an optical waveguide film according to the present exemplary embodiment. FIGS. 3A to 3E are process diagrams showing a method for manufacturing an optical waveguide film according to the present exemplary embodiment. FIGS. 4A to 4E are process diagrams showing a method for manufacturing an optical waveguide film according to another exemplary embodiment. FIGS. 3A to 3E, and FIGS. 4A to 4E are process diagrams in the cross section taken along line A-A indicated in FIG. 1A.

Figure 3A:
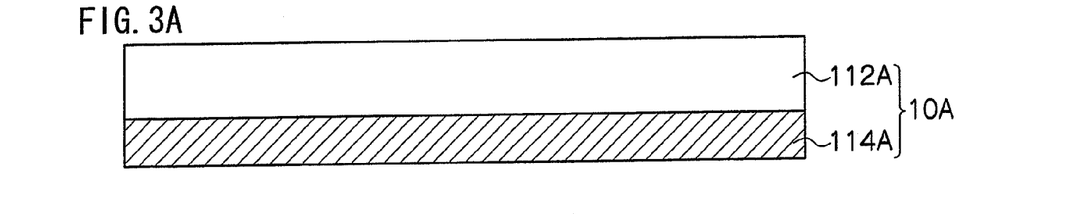
FIGS. 3A to 3E are process diagrams showing a method for manufacturing an optical waveguide film according to an exemplary embodiment of the present invention.

In the method for manufacturing the optical waveguide film 10 according to the present exemplary embodiment, first, as shown in FIG. 3A, a polymer film 10A (a layered body) in which the cladding layer 114A and the core layer 112A are disposed in this order is prepared. The method of providing individual layers of the polymer film 10A is not particularly limited as long as the respective layers are disposed to form an integrated layered body in which separation between layers does not occur. For example, known methods such as a lamination method or spin coating may be employed.

The material that constitutes the cladding layer 114A is not particularly limited as long as there is a predetermined difference in the refractive index between the core layer 112A (optical waveguide core 112) and the cladding layer 114A. According to the purposes, the material is selected in consideration of optical properties such as refractive index and optical transmittance thereof, mechanical strength, heat-resistant property, flexibility and the like. For example, it is preferable to select a material from radiation-curable resins, electron beam-curable resins, and thermosetting resins, more preferably from ultraviolet ray-curable resins and thermosetting resins. A preferable example is a ultraviolet rays-curable or thermosetting monomer or oligomer, or a mixture of the monomer and the oligomer. It is more preferable to select an ultraviolet ray-curable resin is selected.

Examples of specific materials that can constitute the cladding layer 114A include epoxy resins, acrylic resins (such as polymethyl methacrylate), alicyclic acrylic resins, styrene resins (such as polystyrene and acrylonitrile-styrene copolymers), olefin resins (such as polyethylene, polypropylene, and ethylene-propylene copolymer), alicyclic olefin resins, vinyl chloride resins, vinylidene chloride resins, vinyl alcohol resins, vinyl butyral resins, arylate resins, fluorine-containing resins, polyester resins (such as polyethylene terephthalate and polyethylene naphthalate), polycarbonate resins, cellulose diacetate (or cellulose triacetate), amide resins (such as aliphatic polyamide and aromatic polyamide), imide resins, sulfone resins, polyether-sulfone resins, polyether-ether ketone resins, polyphenylene sulfide resins, polyoxymethylene resins, and blends of these resins.

The cladding layer 114A may be formed by dropping a liquid-like resin selected from the aforementioned materials onto a substrate made of glass or the like, making the thickness uniform by spin coating, and thereafter curing the resin. Alternatively, it is also possible to use as the cladding layer 114A a resin film that has been formed in advance.

The thickness of the cladding layer 114A is not particularly limited, and from the viewpoint of optical properties, flexibility, processability at cutting described below, strength and the like, it is preferably in the range of from 10 µm to 100 µm, and more preferably from 20 µm to 50 µm.

As the core layer 112A, for example, an ultraviolet-ray curable resin is used, and an ultraviolet-ray curable monomer or oligomer, or a mixture of the monomer and the oligomer may be used. Specific examples of the core include epoxy ultraviolet-ray curable resins and acrylic ultraviolet-ray curable resins.

The core layer 112A is formed by, for example, coating the cladding layer 114A with a core curable resin (ultraviolet-ray curable resin) in a liquid state in a uniform thickness, and thereafter, curing the resin by irradiation with ultraviolet rays using an ultraviolet lamp, a ultraviolet LED, or a UV irradiation device.

The thickness of the core layer 112A is not particularly limited, and may be appropriately set according to the purpose. From the viewpoint of optical properties, flexibility, processability at cutting described below, strength and the like, the thickness is preferably from 20 µm to 120 µm, and more preferably from 30 µm to 90 µm.

Further, the size and total thickness of the polymer film 10A are not particularly limited, and may be appropriately set depending upon the material, applications thereof, and the like. For example, in order to form a flexible optical waveguide film 10, the thickness of the polymer film 10A is preferably from 50 µm to 500 µm, and more preferably from 50 µm to 200 µm. The width of the polymer film 10A is preferably from 0.2 mm to 10 mm, and more preferably from 0.25 mm to 5 mm. The bending property and strength as the optical waveguide may be readily ensured when the thickness and width of the optical waveguide film 10 are respectively within the aforementioned ranges.

Figure 3B:
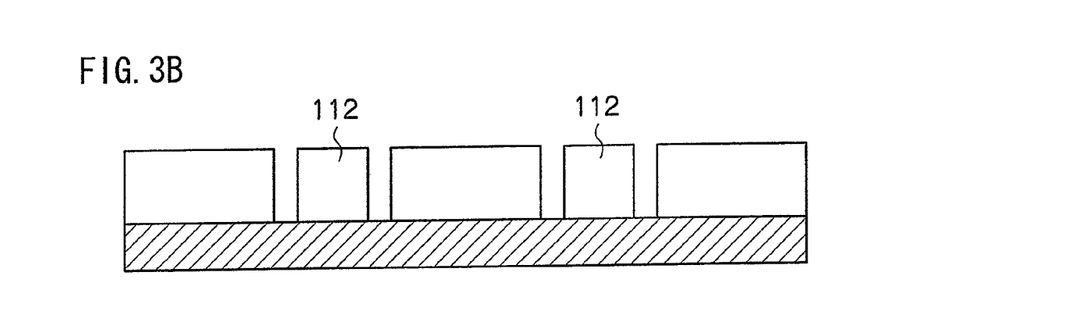

Next, as shown in FIG. 3B, the polymer film 10A is cut from the core layer 112A side, that is to say, the core layer 112A is cut, thereby forming the optical waveguide cores 112. The optical waveguide cores 112 is formed by cutting the polymer film 10A along the longitudinal direction thereof by, for example, a dicing saw at predetermined intervals in the widthwise direction of the polymer film 10A (which intervals become the widths of the optical waveguide cores 112). Due to the aforementioned cutting, plural optical waveguide cores 112 are provided on the same plane of the cladding layer 114A wherein the plural optical waveguide cores are arranged in parallel with one another in the widthwise direction of the polymer film 10A and allows optical rays to propagate in parallel. In the present exemplary embodiment, two optical waveguide cores 112 are formed.

Figure 3C:
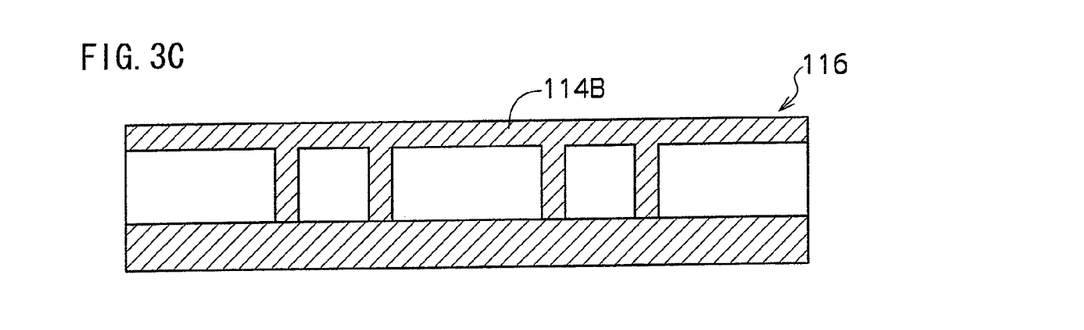

As shown in FIG. 3C, a cladding layer 114B is formed by applying a curable resin for forming a cladding to cover the optical waveguide core 112, that is to say, fill in the cut grooves formed by the aforementioned cutting, and then curing the curable resin. Specifically, for example, a curable resin for forming a cladding is dropped onto the cut surface of the polymer film 10A, and is spread out by centrifugal force using spin coating. As a result, the curable resin for forming a cladding is applied onto the optical waveguide cores 112, and also fills the cut grooves. The resin is then cured. The method of applying the curable resin for forming a cladding is not limited to spin coating. For example, a method may be used in which the curable resin for forming a cladding is exposed to be cured while being pushed by a glass substrate with the thickness of the curable resin film controlled by a spacer. As a result, the cladding 114 (cladding layers 114A and 114B) that encloses the optical waveguide core 112 is formed.

The cladding-forming curable resin for forming the cladding layer 114B is a liquid material, and may be selected, for example from radiation curable resins, electron-beam curable resins, thermosetting resins and the like. Among them, preferred curable resins include ultraviolet-ray curable resins and thermosetting resins, and ultraviolet-ray curable resins are more preferable. As the ultraviolet-ray curable resins and the thermosetting curable resins, it is preferable to use a ultraviolet-ray curable or thermosetting monomer or oligomer, or a mixture of the monomer and the oligomer. As the ultraviolet-ray curable resins, epoxy ultraviolet-ray curable resins and acrylic ultraviolet-ray curable resins may be used. The thermosetting resins may be selected from polyimide resins and silicone resins.

Next, although not illustrated in the drawings, both of the longitudinal-direction end portions of the polymer film 10A, having the optical waveguide cores 112 formed therein, are cut to form a mirror surface (a slanted structure) on the end surface of the cladding 114 and also on the end surface of the optical waveguide core 112, wherein the mirror surface forms an angle of, for example, 45 degrees with the longitudinal direction of the polymer film 10A. The aforementioned cutting by which the end surface of the cladding 114 and the end surface of the optical waveguide core 112 are made mirror surfaces is performed by, for example, cutting the polymer film 10A with a dicing saw having a blade with a 45-degree slanted structure at its blade edge.

In such a manner, the optical waveguide film main body 116 is prepared.

Figure 3D:
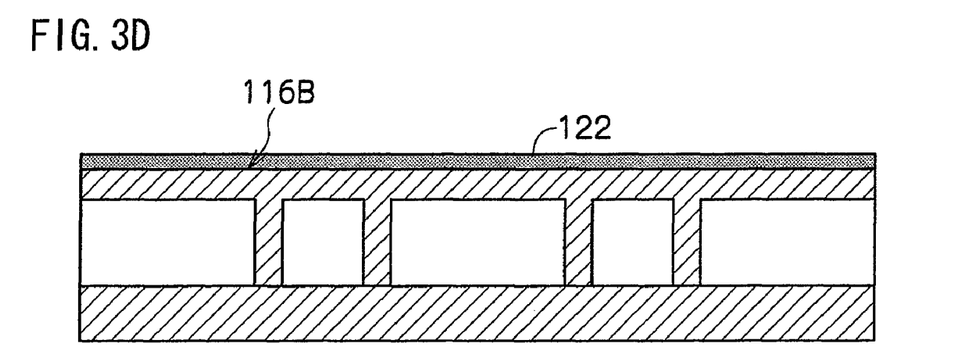
Figure 5:
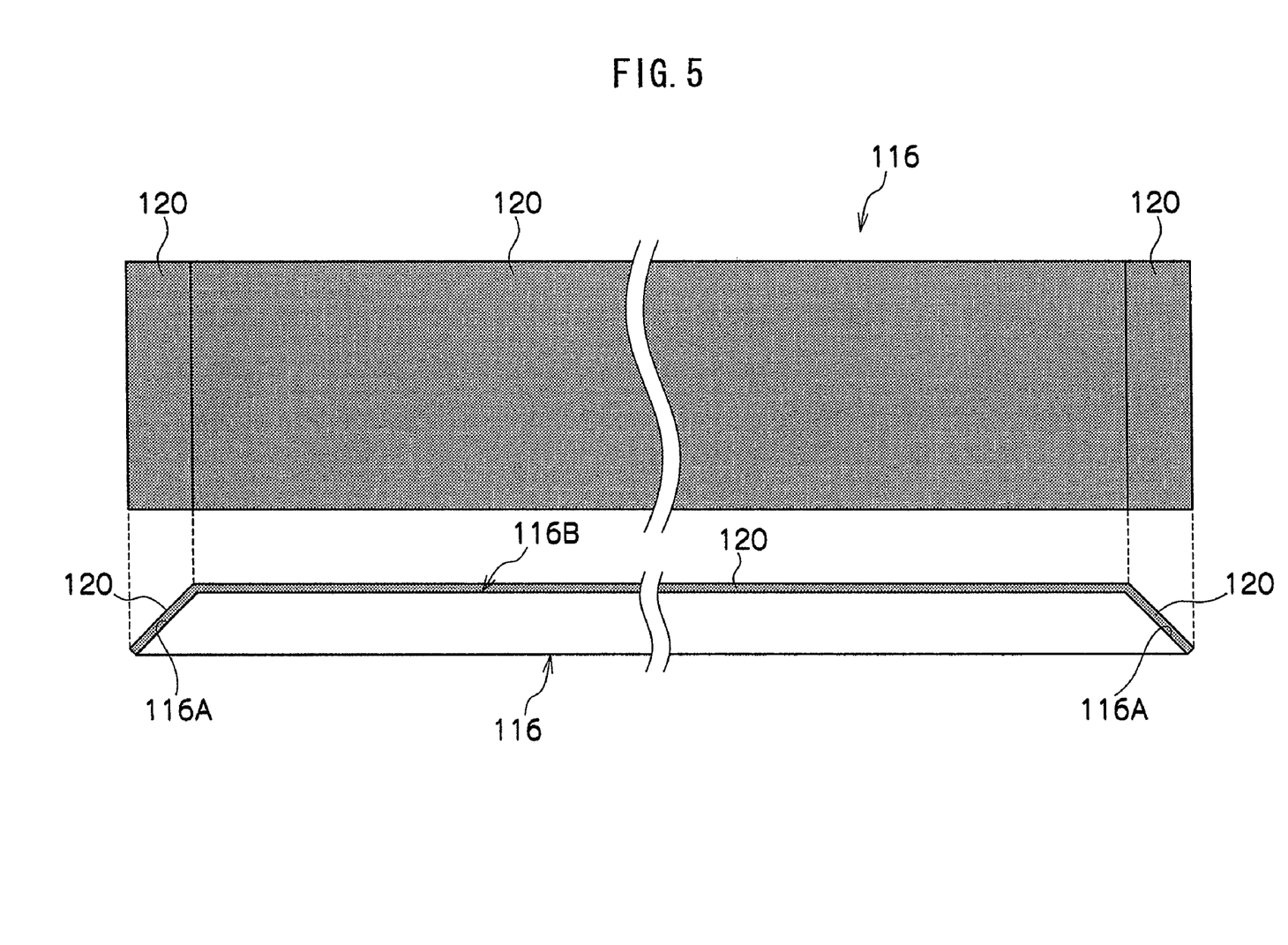
FIG. 5 is a two-plane view showing the state in which a metal layer is formed on a main body of the optical waveguide film (a plan view: a diagram seen from a direction of film thickness; a side view: a diagram seen from the widthwise direction of the film)

Subsequently, as shown in FIG. 3D, a metal layer 122 is formed on the entire surface of the mirror surface 116A (see FIG. 5) as well as on the entire surface of the principal surface 116B of the optical waveguide film main body 116 thus obtained. Formation of the metal layer 122 is carried out by, for example, vapor-deposition, sputtering, plating or the like. Among them, vapor-deposition and sputtering are suitably used. Here, FIG. 5 is a two-plane view showing the formation of the metal layer 122 on the optical film main body 116 (plan view: a diagram when viewed from the direction of film thickness; side view: a diagram when viewed from the widthwise direction of the film).

Figure 3E:
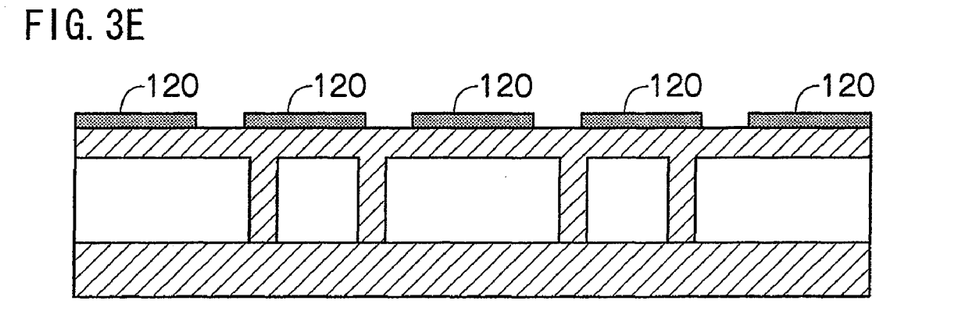
Figure 6:
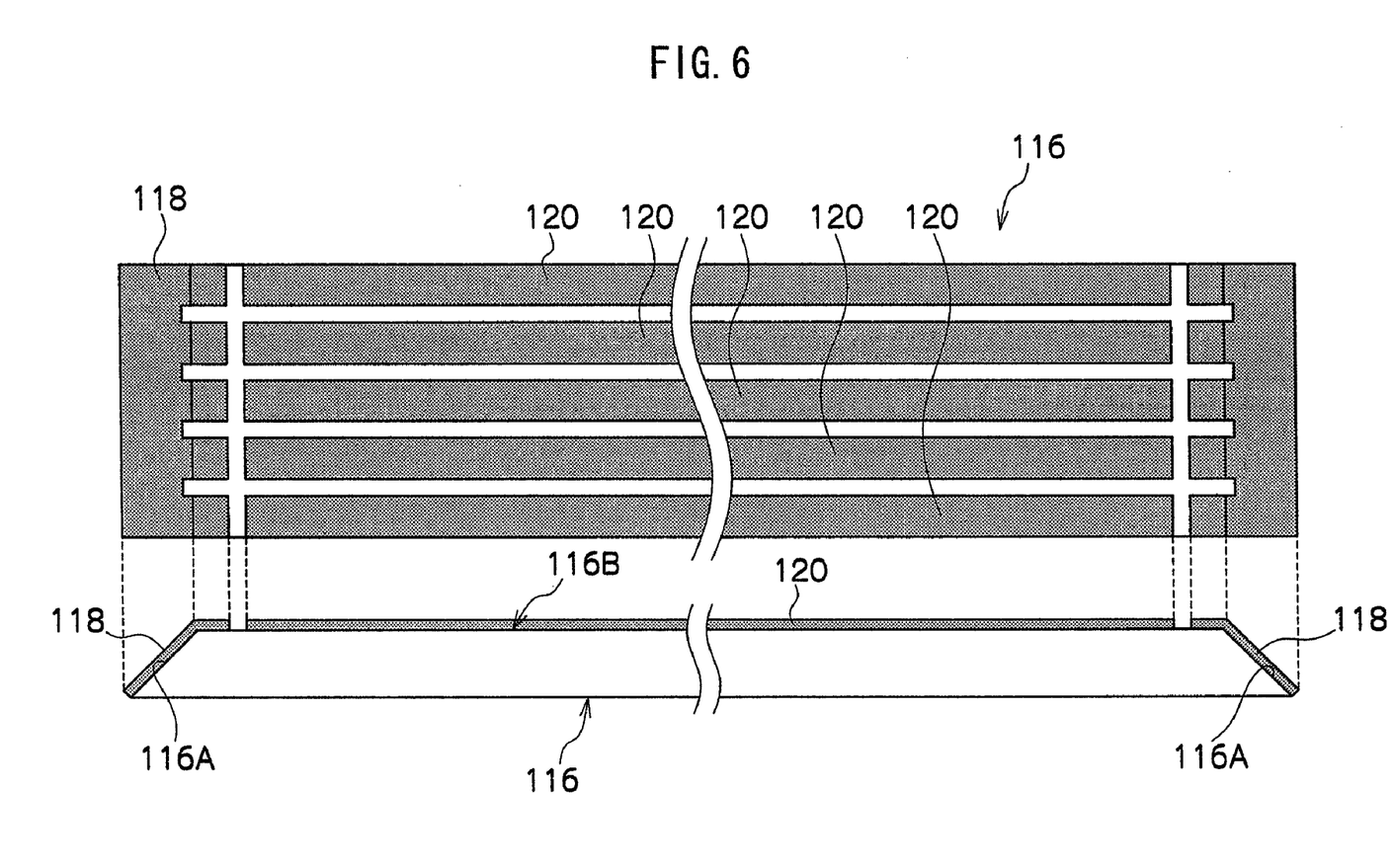
FIG. 6 is a two-plane view showing the state in which a metal layer formed on the optical waveguide film main body is cut (a plan view: a diagram seen from the direction of film thickness; and a side view: a diagram seen from the widthwise direction of the film)

Next, as shown in FIG. 3E, parts of the metal layer 122 formed on the optical waveguide film main body 116 are cut out by a dicing saw (see FIG. 6). Specifically, for example, first, parts of the metal layer 122 formed at both end portions in the longitudinal direction of the principal surface 116B are cut out in a predetermined width along the widthwise direction of the film in order to separate the metal layer 122 formed on the mirror surface 116A and the metal layer 122 formed on the principal surface 116B. Subsequently, parts of the metal layer 122 formed on the principal surface 116B of the optical waveguide film main body 116 are cut out in a predetermined width along the longitudinal direction. The cutting is carried out at predetermined intervals in the widthwise direction of the film (in the present exemplary embodiment, four cutting grooves are formed in the metal layer). Hence, independently from the metal layer 122 (mirror layer 118) formed on the mirror surface 116A, strips of an electric wiring layer 120 is formed on the principal surface 116B of the optical waveguide film main body 116 wherein the strips extends from one end portion to the other end portion along the longitudinal direction of the optical waveguide film main body 116, and are arranged in parallel at predetermined intervals in the widthwise direction of the optical waveguide film main body 116. Here, FIG. 6 is a two-plane view showing a state in which the metal layer 122 formed on the optical waveguide film main body 116 has been cut out (plan view: a diagram when viewed from the direction of film thickness; and side view: a diagram when viewed from the widthwise direction of the film).

In such a manner as described above, the optical waveguide film 10 with the electric wiring layer 120 formed thereon is prepared.

Figure 4A:
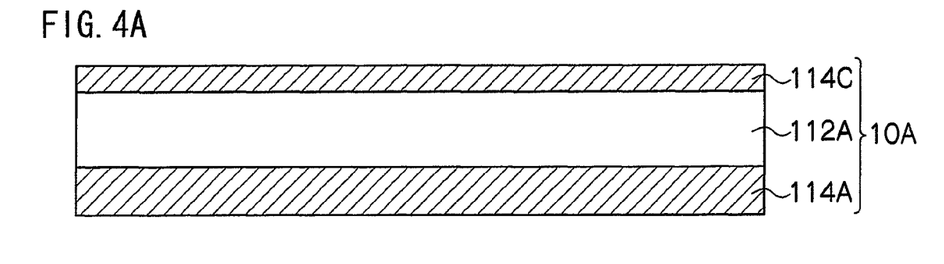
FIGS. 4A to 4E are process diagrams showing a method for manufacturing an optical waveguide film according to another exemplary embodiment.

In a method for manufacturing an optical waveguide film 10 according to another exemplary embodiment, as shown in FIG. 4A, a polymer film 10A (a layered body) is prepared in which a cladding layer 114A, a core layer 112A and a cladding layer 114C are disposed in this order. That is to say, the layered polymer film 10A in which the core layer 112A is sandwiched between the two cladding layers 114A and 114C is prepared.

Here, the material of the cladding layer 114C is not particularly limited as long as a predetermined difference in the refractive index between the material and the core layer 112A can be set. It is possible to use the same material as that of the cladding layer 114A. For example, the same liquid resin as that used for forming the cladding layer 114A may be applied in a uniform thickness onto the core layer 112A, and thereafter, the applied resin may be cured to form the cladding layer 114C.

The thickness of the cladding layer 114C is preferably in the range of from 5 μm to 100 μm, and more preferably from 10 μm to 50 m, from the viewpoint of optical properties, flexibility, processability at cutting described below, and strength.

Incidentally, the respective thicknesses of the cladding layer 114A and the cladding layer 114C do not have to be the same. For example, the thickness of the cladding layer 114C may be made smaller than that of the cladding layer 114A, so as to achieve a small total thickness of the polymer film 10A.

Figure 4B:
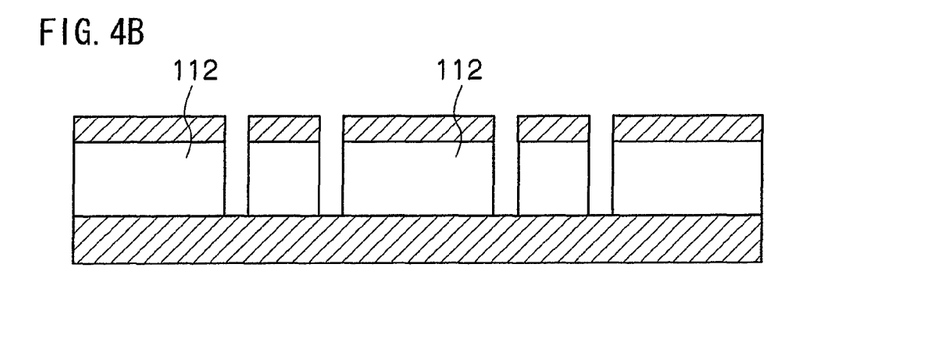

Next, as shown in FIG. 4B, the polymer film 10A is cut from the cladding layer 114C side into the core layer 112A as well as the cladding layer 114C, whereby an optical waveguide core 112 is formed.

Figure 4C:
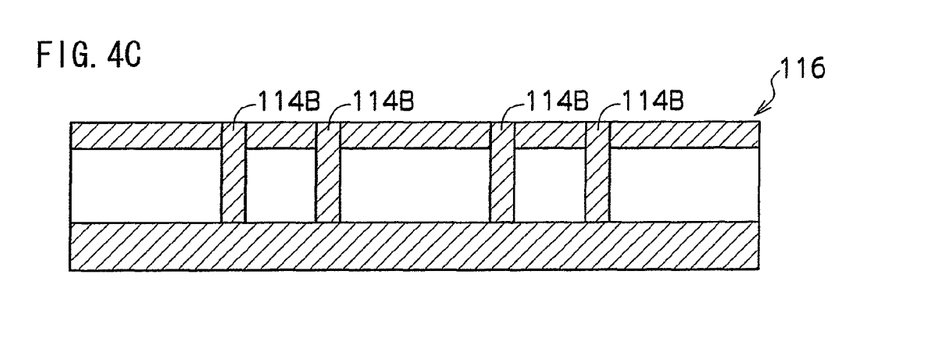

As shown in FIG. 4C, a curable resin is applied so as to cover the optical waveguide core 112, that is to say, so as to fill spaces between plural optical waveguide cores 112 (fill the cut grooves). The curable resin is then cured to from a cladding layer 114B. As a result, the cladding 114 (cladding layers 114A, 114B, and 114C) is formed so as to enclose the optical waveguide core 112.

Next, although not illustrated in the drawings, both longitudinal-direction end portions of the polymer film 10A, at which the optical waveguide cores 112 are formed, are cut, and mirror surfaces 116A (slanted structures) are formed on the end surfaces of the optical waveguide core 112 and on the end surface of the cladding 114 so as to form an angle of, for example, 45 degrees with the longitudinal direction of the polymer film 10A.

In such a manner as described above, the optical waveguide film main body 116 is prepared.

Figure 4D:
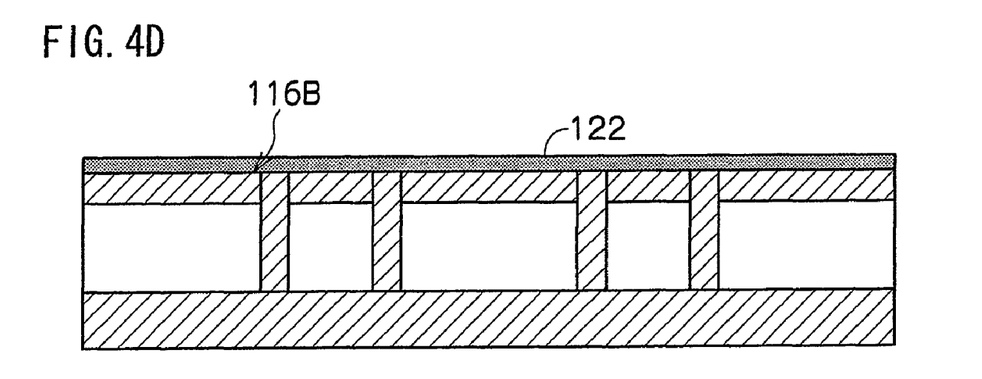

Next, as shown in FIG. 4D, the metal layer 122 is formed on the entire surface of the mirror surface 116A (see FIG. 5), as well as on the entire principal surface 116B of the optical waveguide film main body 116 thus obtained.

Figure 4E:
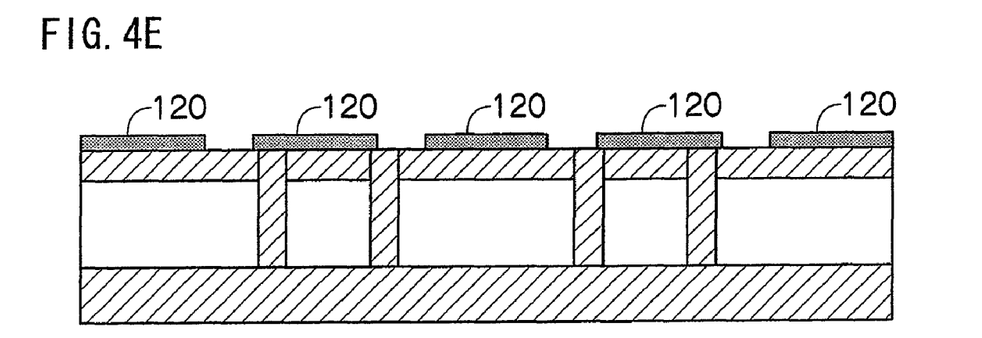

Subsequently, as shown in FIG. 4E, parts of the metal layer 122 formed on the optical waveguide film main body 116 are cut off by a dicing saw (see FIG. 6). As a result, strips of electric wiring layer 120 are formed which extend from one end portion to the other end portion of the optical waveguide film main body 116 along the longitudinal direction thereof, wherein the strips are arranged in parallel at predetermined intervals in the widthwise direction of the optical waveguide film main body 116.

In such a manner as described above, the optical waveguide film 10 having the electric wiring layer 120 formed thereon is prepared. The other portions of the manufacturing method than those described above are the same as the method for manufacturing the optical waveguide film 10 illustrated in FIGS. 3A to 3E, and descriptions thereof will be omitted.

The optical waveguide film 10 according to the present exemplary embodiment as described above has a structure in which the electric wiring layer 120 is provided on the principal surface of the optical waveguide film main body 116. The optical waveguide film 10 has both of an electronic element and an optical element and allows propagation of light as well as transmission of electricity. Therefore, the optical waveguide film 10 has a simple structure and high bending property. As a result, low power consumption and high-speed signal processing are realized at the same time.

Further, the electric wiring layer 120 is provided and arranged simply by forming a metal layer by deposition or sputtering, and cutting the metal layer with a dicing saw or the like; therefore lower cost is realized. Moreover, a further cost reduction may be realized by the providing the same metal layer 122 to form both of the electric wiring layer 120 formed on the principal surface 116B of the optical waveguide film main body 116 and the mirror layer 118 formed on the mirror surface 116A, simultaneously.

Optical Transmission and Reception Module

Figure 7:
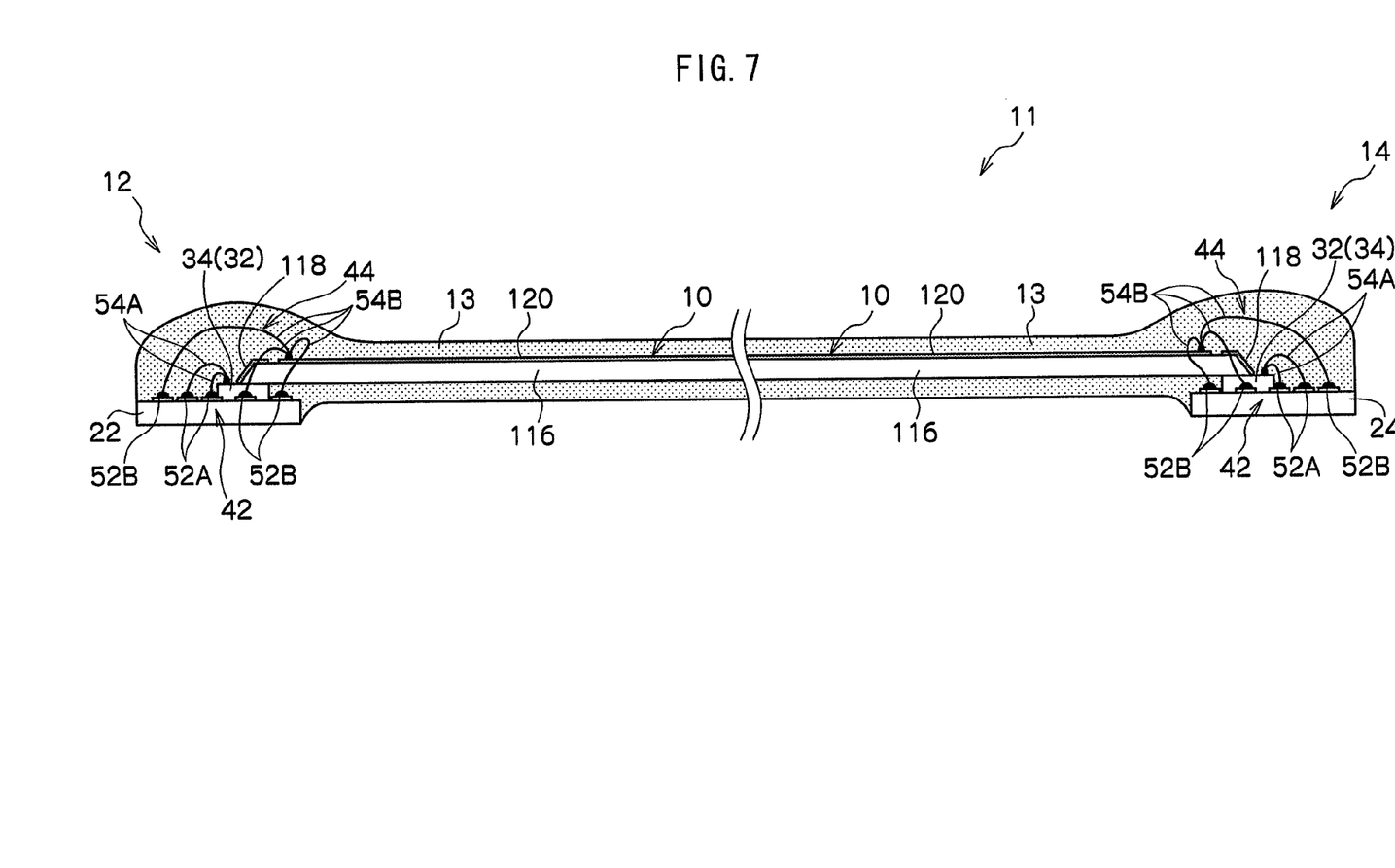
FIG. 7 is a schematic side view of an optical transmission and reception module according to an exemplary embodiment of the present invention.
Figure 8:
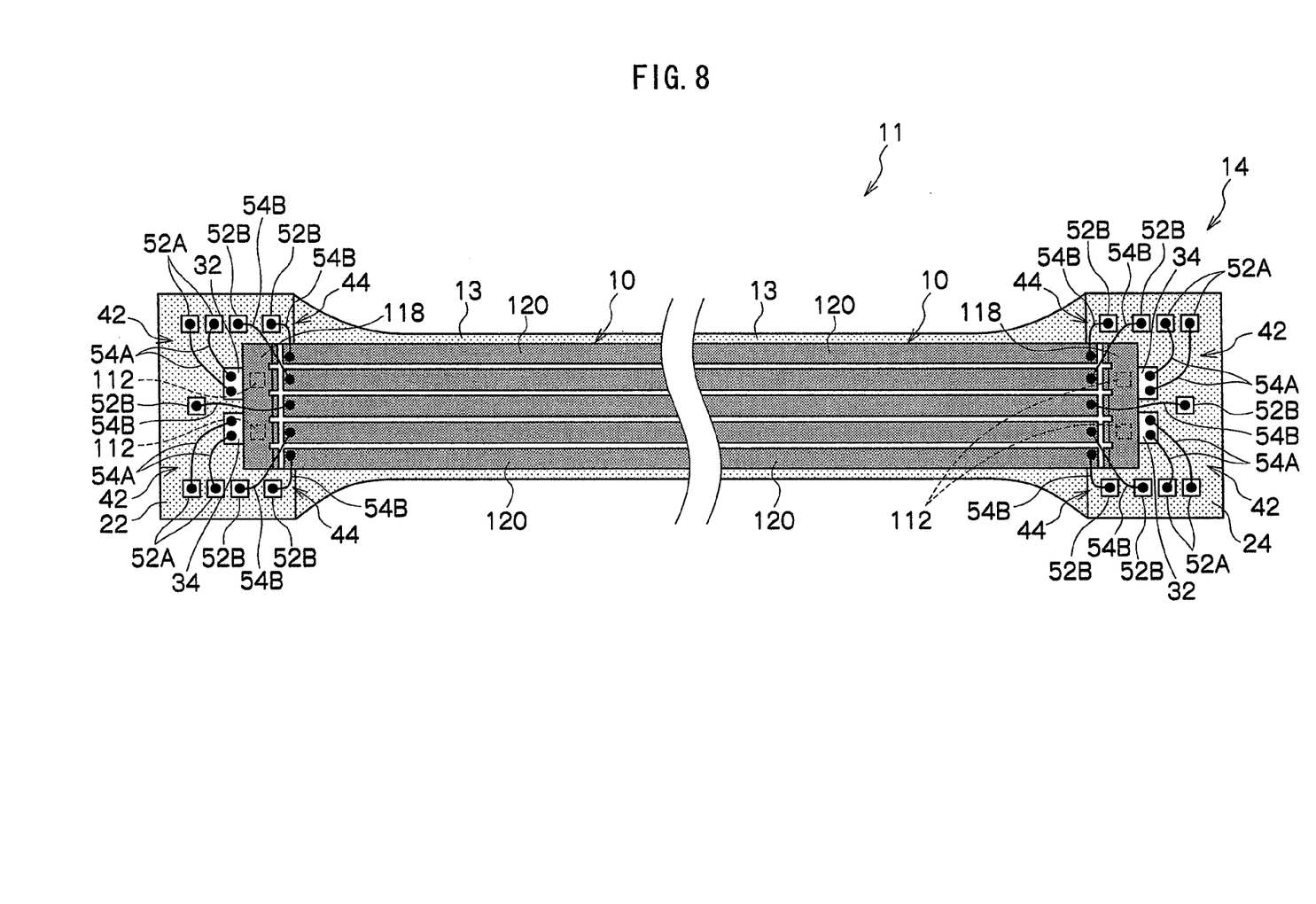
FIG. 8 is a schematic plan view of an optical transmission and reception module according to an exemplary embodiment of the present invention.

FIG. 7 is a schematic side view of an optical transmission and reception module according to an exemplary embodiment of the present invention. FIG. 8 is a schematic plan view of an optical transmission and reception module according to an exemplary embodiment of the present invention. An optical transmission and reception module 11 according to the present exemplary embodiment is, as shown in FIGS. 7 and 8, formed by a belt-shaped optical waveguide film 10 and optical transmission and reception sections 12 and 14 that transmit and receive optical signals via an optical waveguide formed in the optical waveguide film 10. Then, as the optical waveguide film 10 mentioned herein, the optical waveguide film 10 according to any of the aforementioned exemplary embodiments is applied.

The optical transmission and reception section 12 includes a holding member 22, and one end portion of the optical waveguide film 10 is held on the holding member 22. The optical transmission and reception section 14 includes a holding member 24, and the other end portion of the optical waveguide film 10 is held on the holding member 24.

The holding member 22 and the holding member 24 are each provided with a light receiving element 34, a light emitting element 32, a wire connecting section 44 for transmission and reception of a signal by the light receiving and emitting elements, and a wire connecting section 42 that provides electric connection to the electric wiring layer 120 of the optical waveguide film 10. Although not illustrated in the drawings, at least one driving circuit and at least one amplification circuit for the light receiving element 34 and the light emitting element 32 may also be provided.

At the wire connecting section 42 for performing transmission and reception of a signal by the light receiving and emitting element, the light receiving element 34 and the light emitting element 32 are connected by wires 54A to electrodes 52A provided at each of the holding member 22 and 24 (in the present exemplary embodiment, two electrodes 52A are provided at each holding member), in order to allow, from outside of the module, amplification of a signal transmitted and received by the light receiving and emitting element and driving of the light receiving and emitting element.

At the wire connecting section 44 for providing electric connection to the electric wiring layer 120 of the optical waveguide film 10, an end of the electric wiring layer 120 is connected by wires 54B to electrodes 52B (in the present exemplary embodiment, five electrodes are provided since five strips of an electric wiring layer are provided) provided at each of the holding member 22 and the holding member 24, in order to provide power supply, transmission and reception of electric signals, earth connection and the like by providing electric connection to the electric wiring layer 120 from outside of the module.

The optical waveguide film 10 provided in the optical transmission and reception module 11, and the light receiving element 34, the light emitting element 32, the wire connecting section 42, and the wire connecting section 44 provided at each of the holding member 22 and the holding member 24, are coated with a flame retardant resin, so that a flame retardant resin layer 13 is formed on the surfaces of these members. The flame retardant resin layer 13 covers the electric wiring layer 120 provided in the optical waveguide film 10, and functions as the protective layer for the electric wiring layer 120.

In the present exemplary embodiment, the state of "being coated with the flame retardant resin" refers to a state in which due to the formation of the flame retardant resin layer 13 made of the flame retardant resin on members to be coated, the members are not exposed to the outside air.

In the present exemplary embodiment, explanation is given assuming that all of the optical waveguide film 10, and the light receiving element 34, the light emitting element 32, the wire connecting section 42 and the wire connecting section 44 provided at each of the holding member 22 and the holding member 24, are coated with the flame retardant resin.

It is preferable that all of the optical waveguide film 10 and the light receiving element 34, the light emitting element 32, the wire connecting section 42, and the wire connecting section 44 provided at each of the holding members 22 and 24 are coated from the viewpoint of improvement in the flame retardancy of the optical transmission and reception module 11. However, coating at least the optical waveguide film 10 with the flame retardant resin may suffice. It is more preferable to coat the optical waveguide film 10 and at least one of the light receiving element 34, the light emitting element 32, the wire connecting section 42, and the wire connecting section 44 provided at each of the holding members 22 and 24, with the flame retardant resin.

The flame retardant resin used in the present exemplary embodiment is a resin having a flame retardancy of HB or higher on a UL 94 test wherein the optical waveguide film 10, when its surface is coated with the flame retardant resin layer 13, has a minimum bending radius of 1 mm to 3 mm (or about 1 mm to about 3 mm).

The UL 94 test of the flame retardant resin is conducted using a strip-shaped specimen having a width of 13.0 mm, a length of 125 mm, and a thickness of 100 μm (, which is a practically minimum value). The UL 94 test is a known flame test in which the degree of the specimen burning is inspected by applying flame from a gas burner to the specimen according to a vertical flame test or a horizontal flame test. The grade of flame retardancy of general materials based on UV 94 test includes 5VA, 5VB, V-0, V-1, V-2, and HB in the order of from highest flame retardancy to lowest flame retardancy. The flame retardant resin of the present exemplary embodiment has a flame retardancy of HB or higher in a UL 94 test when formed as a flame retardant resin layer, preferably V-2 or higher, and more preferably V-0 or higher. The UL 94 test is incorporated herein by reference.

In the present exemplary embodiment, the flame retardant resin having the aforementioned properties may be a resin including, as a main component, a dimethyl polysiloxane (HO—[Si(CH$_3$)$_2$O]$_n$—H) having a degree of polymerization of 200 to 1000. The flame retardant resin including, as the main component, a dimethyl polysiloxane refers to a resin that contains a dimethyl polysiloxane in an amount of at least 30 weight %.

It is known that a slight amount of cyclic dimethyl polysiloxane is contained in a dimethyl polysiloxane obtained by a normal production process. Since the cyclic dimethyl polysiloxance has no reactivity and is volatile, troubles caused by electric contact may occur.

For this reason, in the present exemplary embodiment, a flame retardant resin in which the content of cyclic low-molecular siloxane containing 3 to 20 (trimer to 20-mer, D3 to D20) cyclic dimethyl units (D body) is 500 ppm or less (or about 500 ppm or less), preferably 300 ppm or less.

The flame retardant resin may contain a filler having flame retardancy (a flame retardant filler). The flame retardant filler may be titanium oxide, silicon oxide, aluminum oxide or the like When the flame retardant resin contains the flame retardant filler, the amount of the flame retardant filler relative to 100 weight parts of dimethyl siloxane may be in the range of from 1 weight part to 70 weight parts.

The flame retardant resin is applied onto respective members to be coated, and is cured by being left at room temperature or by heating, so that the flame retardant resin layer 13 is provided on the surfaces of the respective members. The application of the flame retardant resin is carried out with a dispenser or the like. Therefore the viscosity of the flame retardant resin at the time of the application may be sufficiently low. Specifically, the viscosity may be from 1 Pa·s to 30 Pa·s (or about 1 Pa·s to about 30 Pa·s), preferably 2 Pa·s to 20 Pa·s. For the purpose of viscosity adjustment, a solvent may be added to such a degree that no adverse effect is exerted by the solvent.

The thickness of the flame retardant resin layer 13, formed by applying the flame retardant resin onto the respective members and curing the flame retardant resin, may be from 20 μm to 100 μm (or about 20 μm to 100 μm) in the straight-line portion that is required to have bending property, more preferably 30 μm to 80 μm. At the holding members 22 and 24 that are not required to have bending property, since wires that connect electrodes is preferably entirely coated, the thickness of the flame retardant resin layer may be determined depending on cases.

Further, the tensile strength of the frame retardant resin layer 13 may be from 0.5 MPa to 5 MPa (or about 0.5 MPa to about 5 MPa), preferably from 1.0 MPa to 4.0 MPa.

Measurement of the tensile strength and the viscosity is performed based on JIS-K6249, which is incorporated herein by reference.

Moreover, the optical waveguide film 10 having the flame retardant resin layer 13 on a surface thereof, formed by applying the flame retardant resin, may have a minimum bending radius of 1 mm to 3 mm. The optical waveguide film 10 coated with the flame retardant resin preferably has a thickness of from 50 μm to 500 μm, in order to enhance flexibility when deformed, more preferably from 100 μm to 300 μm. Furthermore, for a similar reason, the optical waveguide film 10 preferably has a width of from 0.25 mm to 10 mm, more preferably from 0.3 mm to 3 mm. In this case, the thickness of the optical waveguide film 10 (in an uncoated state) may be in the range of from 60 μm to 100 μm.

Next, the structure of the optical transmission and reception section 12 having the holding member 22 will be described. Since the holding member 24 has the same structure as that of the holding member 22 and the optical transmission and reception section 14 has the same structure as that of the optical transmission and reception section 12, descriptions of the holding member 24 and the optical transmission and reception section 14 are omitted.

The holding member 22 is made of a substrate that is substantially rectangular parallelepiped. The holding member 22 is provided with the light receiving element 34, the light emitting element 32, the wire connecting section 42, and the wire connecting section 44.

In the present exemplary embodiment, an optical waveguide used to transmit an optical signal from the optical transmission and reception section 12 is called an optical waveguide for transmission of the signal, and an optical waveguide used to receive an optical signal from the optical transmission and reception section 12 is called an optical waveguide for receiving the signal. However, when these optical waveguides are considered in terms of the function of the optical transmission and reception section 14, the optical waveguide for transmission of the signal and the optical waveguide for receiving the signal are reversed.

In the optical transmission and reception section 12, for example, the light emitting element 32 and the light receiving element 34 are mounted on the holding member 22 by using a flip chip bonder or the like. Next, the optical waveguide film 10 is mounted on the light emitting element 32 and the light receiving element 34 by using a flip chip bonder. As a result, the optical waveguide film 10 is brought into the state of being held by the holding member 22 and the holding member 24. Then, the light emitting element 32 and the light receiving element 34 are connected to the electrodes 52A by wires 54A. Further, one end portion of the electric wiring layer 120 is connected to the electrodes 52B by wires 54B.

Further, the surfaces of the light emitting element 32, the light receiving element 34, the wire connecting section 42, the wire connecting section 44, and the optical waveguide film 10, which members are mounted or held on each of the holding member 22 and holding member 24, are coated with a flame retardant resin by using a dispenser, whereby the flame retardant resin layer 13 is formed by the flame retardant resin on the surfaces of these members. The coating using a dispenser may be carried out by putting a module in a mold having a depression.

Through the aforementioned process, the optical transmission and reception module 11 of the present exemplary embodiment in which the surfaces of the light emitting element 32, light receiving element 34, wire connecting section 42, wire connecting section 44 and optical waveguide film 10 as components of the optical transmission and reception module 11 are coated with the flame retardant resin, is prepared.

Next, an operation of the optical transmission and reception module 11 according to the present exemplary embodiment will be described. In the description given herein, an optical waveguide for transmission of an optical signal refers to an optical waveguide to which the optical transmission and reception section 12 transmits an optical signal, and an optical waveguide for receiving an optical signal refers to an optical waveguide from which the optical transmission and reception section 12 receives an optical signal.

In the optical transmission and reception module according to the present exemplary embodiment, when an optical signal is transmitted from the optical transmission and reception section 12 to the optical transmission and reception section 14, light emitted from the light emitting element 32 held by the holding member 22 of the optical transmission and reception section 12 enters the optical waveguide core 112 from an incident end surface of the optical waveguide core 112 of the optical waveguide for transmission of the signal, and is transmitted through the optical waveguide for transmission of the signal formed in the optical waveguide film; the light coming out of the outputting end surface of the optical waveguide core 112 of the optical waveguide for transmission is received by the light receiving element 34 held by the holding member 24 of the optical transmission and reception section 14.

Similarly, when the optical signal transmitted from the optical transmission and reception section 14 is received by the optical transmission and reception section 12, light emitted from the light emitting element 32 held by the holding member 24 of the optical transmission and reception section 14 enters the optical waveguide core 112 from an incident end surface (mirror surface 116A) of the optical waveguide core 112 of the optical waveguide for receiving the signal, and is transmitted through the optical waveguide for receiving the signal formed in the optical waveguide film 10. Then, the light coming out of the outputting end surface (mirror surface 116A) of the optical waveguide core 112 of the optical waveguide for receiving the signal is received by the light receiving element 34 held by the holding member 22 of the optical transmission and reception section 12.

Along with the aforementioned optical transmission and reception, for example, electrical processing such as power supply, transmission and reception of an electrical signal, earth connection or the like is also performed via the electric wiring layer 120 provided to the optical waveguide film 10.

In the aforementioned exemplary embodiment, a description was given of an optical transmission and reception module that allows two-way optical communication between the optical transmission and reception sections each having both of a light emitting element and a light receiving element mounted thereon. However, the module may alternatively be an optical transmission and reception module in which one-way optical communication is carried out between a light transmitting section having a light emitting element and a light receiving section having a light receiving element.

EXAMPLES

The present invention will be hereinafter described specifically by way of examples. However, the examples should not be construed as limiting the invention.

Example 1

<Preparation of Optical Waveguide Film Main Body>

First, an epoxy film which has a high refractive index and which will serve as a core (thickness: 50 μm, refractive index: 1.57) is prepared. Next, an epoxy ultraviolet-ray curable resin having a refractive index of 1.51 is applied by spin coating onto both surfaces of the epoxy film, such that the applied resin has a thickness of 20 μm. The applied epoxy ultraviolet-ray curable resin is cured by irradiation with ultraviolet rays, whereby a three-layer film is obtained.

Next, the three-layer film is placed in a dicing saw (DAD 321, available from DISCO Corporation), and is cut from the principal surface side (uppermost surface side) by using a dicing saw equipped with a blade having a thickness of 100 μm at a cutting precision of 75 μm±5 μm. Subsequently, cutting position is shifted by 50 μm, and cutting is conducted again to form a protruding portion corresponding to a core having a core diameter of 50 μm. Then, the cutting position is shifted by 450 μm and cutting is conducted, and the cutting position is shifted by 50 μm and cutting is conducted. As a result, two cores having a core diameter of 50 μm and core pitch of 500 μm are formed.

Next, the epoxy ultraviolet-ray curable resin having a refractive index of 1.51 is applied to fill the groove portion formed by the aforementioned cutting, and thereafter cured by irradiation with ultraviolet rays, whereby a belt-shaped optical waveguide film having a width of 1.0 mm and a thickness of 90 μm is formed.

Subsequently, both ends of the optical waveguide film are cut at an angle of 45 degrees relative to the optical axis, by using a dicing saw equipped with a blade having an angle of 45 degrees for silicon, whereby a mirror surface is formed at an angle of 45 degrees where the cores are exposed.

Thus, an optical waveguide film main body is prepared.

<Preparation of Electric Wiring Layer on Optical Waveguide Film Main Body>

Then, an Ag alloy layer having a thickness of 1.7 μm is deposited on the entire surface of the waveguide film main body (including the 45-degree mirror surface but excluding the surface that contacts the floor) by sputtering of an Ag alloy. The sputtering for forming the Ag alloy layer is conducted by using a high-rate sputtering apparatus (SH-450 available from ULVAC) at a power of 0.8 kW and a pressure of 0.17 Pa, and the sputtering time for film formation is 10 minutes.

Next, in order to separate the Ag alloy layer formed on the mirror surface of the optical waveguide film main body and the Ag alloy layer formed on the upper surface of the optical waveguide film main body, cutting is conducted with a dicing saw having a 50 μm-thick dicing blade at positions each of which is 0.5 mm apart from either of the end portions of the upper surface of the optical waveguide film in the longitudinal direction, whereby the Ag alloy layer formed on the mirror surface and the Ag alloy layer formed on the upper surface are separated (a separation width, at which the Ag alloy layer is absent, is 53 μm).

Subsequently, the Ag alloy layer formed on the upper surface of the optical waveguide film main body is cut four times with the dicing blade having a thickness of 50 μm along the longitudinal direction of the film at pitches of 200 μm. As a result, five lines of electric wiring layer are formed on the upper surface of the optical waveguide film main body wherein the five lines extend along the longitudinal direction of the optical waveguide film main body from one end portion to the other end portion of the optical waveguide film main body, have intervals of 200 μm in the widthwise direction of the optical waveguide film main body, and each have a widthwise dimension of 150 μm. As a result, an optical waveguide film having a mirror layer having a thickness of 90 μm, a length of 100 mm, a width of 1 mm (Ag alloy layer), and five lines of an electric wiring layer (Ag alloy layer having a thickness of 1.7 μm) is prepared.

<Mounting on Module>

A VCSEL element (trade name: AM-0001; available from Fuji Xerox Co., Ltd.) and a photodiode element (trade name: D8485-1026; available from EMCORE CORPORATION) are mounted on a silicon substrate having the thickness of 600 μm by using a flip chip bonder, and thereafter, the electrodes of the respective chips are connected by a wire bonder to electrodes provided on the silicon substrate.

Subsequently, the optical waveguide film thus obtained is mounted on the VCSEL element and also on the photodiode element by using a flip chip bonder. At the time of mounting, an epoxy-type ultraviolet-ray curable resin is used for bonding, and the film is cured by irradiation of ultraviolet rays. Finally, one end portion of each of the lines of the electric wiring layer of the optical waveguide film is connected by a wire bonder to an electrode provided on the silicon substrate. As a result, an optical transmission and reception module is prepared.

<Application of Flame Retardant Resin>

As the flame retardant resin, one liquid-type condensation curable silicone resin available from Shin-Etsu Chemical Co., Ltd. is prepared. Properties of the frame retardant resin used in Example 1

| | |
|---|---|
| Viscosity in the uncured state: | 20 Pa · s |
| Tensile strength: | 4.0 MPa |
| Content of cyclic dimethyl type low-molecular siloxane in which the degree of combined cyclic dimethyl siloxane units is in the range of D3 (trimer) to D20 (20-mers): | less than 300 ppm |
| Kind of frame retardant filler: | silicon oxide and titanium oxide |
| Content of the frame retardant filler: | 50 weight % |
| Flame retardancy according to UL-94 test: | V-0 |

The flame-retardant resin is applied by using a coating robot (trade name: FAD320S; available from Musashi Engineering Inc.) so as to coat the surface of the optical waveguide film of the optical transmission and reception module prepared in Example 1 and the VCSEL element, the photodiode element, and the respective wire connecting sections (electrodes, wires and the like) mounted on the substrate. Thereafter, the flame-retardant resin is cured by being left at room temperature (25° C.) for 10 minutes.

The thickness of the flame retardant resin layer formed by curing the applied flame retardant resin is measured, and is found to be 0.2 mm.

The minimum bending radius of the optical waveguide film whose surface is coated with the flame retardant resin is measured according to ASTM D-2176, which is incorporated herein by reference. As a result, the minimum bending radium of the optical waveguide film coated with the flame retardant resin is 1.5 mm.

Accordingly, it is found that a photoelectric module capable of optical transmittance and reception is provided which has a simple structure, high bending property and excellent flame retardancy.

Example 2

An optical transmission and reception module is prepared by using the same material and in the same manner as in Example 1, except that the three-layer film prepared in Example 1 is cut by a dicing saw from the principal surface side (uppermost surface side) with a precision of 75 μm±5 μm, the cutting position is shifted by 50 μm and the cutting is again conducted, thereby forming a single core having a core diameter of 50 μm.

Using the prepared optical transmission and reception module, the minimum bending radius of the surface-coated optical waveguide film is measured according to ASTM D-2176. As a result, the minimum bending radius of the optical waveguide film coated with the flame retardant resin is 1.5 mm.

Accordingly, it is found that a photoelectric module capable of optical transmission and reception module is provided which has a simple structure, high bending property and excellent flame retardancy.

Example 3

An optical transmission and reception module is prepared using the same material and in the same manner as in Example 2, except that the flame retardant resin is replaced by a flame retardant resin having the following properties and curing of the flame retardant resin is performed by heating at 120° C. for one hour after coating.

In Example 3, an addition-curable silicone resin of two-liquid type available from Shin-Etsu Chemical Co., Ltd. is prepared as the flame retardant resin. Properties of the flame retardant resin used in Example 3
  Viscosity in the uncured state: 1 Pa·s
  Tensile strength: 1.0 MPa
  Amount of cyclic dimethyl type low-molecular siloxane contained, having the amount combined in the range of D3 (trimer) to D10 (10-mers): less than 500 ppm
  Kind of flame retardant filler: silicon oxide
  Content of the flame retardant filler: 10 weight %
  Flame retardancy according to UL-94 test: V-0

Using the optical transmission and reception module thus prepared, the minimum bending radius of the surface-coated optical waveguide film is measured according to ASTM D-2176. As a result, the minimum bending radius of the optical waveguide film coated with the flame retardant resin is 1.5 mm.

Accordingly, it is found that a photoelectric module capable of optical transmission and reception is provided which has a simple structure, high bending property and excellent flame retardancy.

The invention claimed is:

1. An optical waveguide film comprising:
    an optical waveguide film main body having an optical waveguide core through which light is propagated, and a cladding portion that encloses the optical waveguide core and has a lower refractive index than that of the optical waveguide core; and
    an electric wiring layer formed on at least a part of a principal surface of the optical waveguide film main body,
    wherein the principal surface is an outer surface of the optical waveguide film main body,
    wherein the electric wiring layer is a metal layer,
    wherein the optical waveguide film has, at least at one end portion in a longitudinal direction thereof, a slanted surface that forms an optical path diverting portion at which an optical path of light propagated through the optical waveguide core is diverted, and
    wherein a layer of the same metal as that of the metal layer serving as the electric wiring layer is provided, as a reflecting layer, on the slanted surface.

2. The optical waveguide film according to claim 1, wherein
    the metal layer includes Au, Ag, Cu or an alloy thereof and has a thickness of from about 500 nm to about 5 μm, and
    a minimum bending radius of the optical waveguide film is in a range of from about 1 mm to about 3 mm.

3. An optical transmission and reception module comprising:
    the optical waveguide film according to claim 1;
    a light transmitting section having a light emitting element and a first holding member that holds the light emitting element and one end portion of the optical waveguide film, the one end portion of the optical waveguide film being held such that light emitted from the light emitting element enters the optical waveguide film from an incident end surface of the optical waveguide;
    a light receiving section having a light receiving element and a second holding member that holds the light receiving section and the other end portion of the optical waveguide film, the other end portion of the optical film being held such that light coming out of an outputting end surface of the optical waveguide is received by the light receiving element; and
    wire connecting sections respectively provided at the first holding member and the second holding member and providing electrical connection to the electric wiring layer of the optical waveguide film.

4. An optical transmission and reception module comprising:
    an optical waveguide film comprising:
        an optical waveguide film main body having an optical waveguide core through which light is propagated, and a cladding portion that encloses the optical waveguide core and has a lower refractive index than that of the optical waveguide core; and
        an electric wiring layer formed on at least a part of a principal surface of the optical waveguide film main body;
        wherein the principal surface is an outer surface of the optical waveguide film main body;
    a light transmitting section having a light emitting element and a first holding member that holds the light emitting element and one end portion of the optical waveguide film, the one end portion of the optical waveguide film being held such that light emitted from the light emitting element enters the optical waveguide film from an incident end surface of the optical waveguide;
    a light receiving section having a light receiving element and a second holding member that holds the light receiving section and the other end portion of the optical waveguide film, the other end portion of the optical film being held such that light coming out of an outputting end surface of the optical waveguide is received by the light receiving element; and wire connecting sections respectively provided at the first holding member and the second holding member and providing electrical connection to the electric wiring layer of the optical waveguide film;

wherein at least the optical waveguide film is coated with a flame retardant resin having flame retardancy of HB or higher according to a UL-94 test, and the optical waveguide film whose surface is coated with a flame retardant resin layer of the flame retardant resin has a minimum bending radius of about 1 mm to about 3 mm.

5. The optical transmission and reception module according to claim 4, wherein at least one selected from the group consisting of the optical waveguide film, the light emitting element, the light receiving element and the wire connecting sections is coated with the flame retardant resin.

6. The optical transmission and reception module according to claim 4, wherein at least a region of the optical waveguide film that is in contact with the flame retardant resin layer comprises an acrylic resin or an epoxy resin.

7. The optical transmission and reception module according to claim 4, wherein a content of low-molecular siloxane in the flame retardant resin is about 500 ppm or less.

8. The optical transmission and reception module according to claim 4, wherein the flame retardant resin layer comprises a flame retardant filler.

9. The optical transmission and reception module according to claim 4, wherein a tensile strength of the flame retardant resin is from about 0.5 MPa to about 5 MPa.

10. The optical transmission and reception module according to claim 4, wherein a viscosity of the flame retardant resin is from about 1 Pa·s to about 30 Pa·s.

11. The optical transmission and reception module according to claim 4, wherein a thickness of the flame retardant resin layer is from about 20 µm to about 100 µm.

12. The optical transmission and reception module according to claim 4, wherein the flame retardant resin layer is formed by applying the flame retardant resin by using a dispenser and then curing the resin.

13. The optical transmission and reception module according to claim 4, wherein the flame retardant resin layer functions as a protective layer that protects the electric wiring layer of the optical waveguide film.

14. A method for manufacturing an optical waveguide film comprising:

manufacturing an optical waveguide film main body having an optical waveguide core through which light is propagated and a cladding that has a lower refractive index than that of the optical waveguide core and encloses the optical waveguide core; and forming an electric wiring layer by forming a metal layer on at least a part of a principal surface of the optical waveguide film main body and cutting a part of the metal layer, wherein the manufacturing of the optical waveguide film main body includes manufacturing an optical waveguide film main body having, at least at one end portion in the longitudinal direction thereof, a slanted surface that forms an optical path diverting portion at which an optical path of light propagated through the optical wavelength core is diverted, wherein the forming of the electric wiring layer includes forming an electric wiring layer by forming a metal layer on the slanted surface as well as on at least a part of the principal surface of the optical waveguide film main body having the slanted surface, and cutting a part of the metal layer formed on the principal surface, and wherein the principal surface is an outer surface of the optical waveguide film main body.

15. The method for manufacturing an optical waveguide film according to claim 14, wherein the metal layer is formed by vapor-deposition or sputtering.

16. The method for manufacturing an optical waveguide film according to claim 14, wherein the manufacturing of the optical waveguide film main body includes:

preparing a layered body including at least a first cladding layer and a core layer;

cutting the core layer to form the optical waveguide core through which light is propagated;

forming a second cladding layer so as to enclose the optical waveguide core; and cutting at least one of longitudinal-direction end portions of the layered body to form a slanted surface that serves as an optical path diverting portion at which an optical path of light propagated through the optical waveguide core is diverted.

17. The method for manufacturing an optical waveguide film according to claim 14, wherein the manufacturing of the optical waveguide film main body includes:

preparing a layered body including at least a first cladding layer, a core layer, and a second cladding layer disposed in this order;

cutting the core layer together with the second cladding layer to form the optical waveguide core through which light is propagated;

forming a third cladding layer so as to enclose the optical waveguide core; and cutting at least one of longitudinal-direction end portions of the layered body to form a slanted surface that serves as an optical path diverting portion at which an optical path of light propagated through the optical waveguide core is diverted.

18. The optical waveguide film according to claim 1, wherein the electric wiring layer is physically separated from the optical waveguide core.

19. The optical waveguide film according to claim 1, wherein the reflecting layer covers substantially all of the slanted surface.

20. The method for manufacturing an optical waveguide film according to claim 14, wherein the electric wiring layer is formed to be physically separated from the optical waveguide core.

21. The method for manufacturing an optical waveguide film according to claim 14, wherein the metal layer is formed to cover substantially all of the slanted surface.

22. The optical waveguide film according to claim 1, wherein the principal surface is perpendicular to a thickness direction of the optical waveguide film main body.

23. The optical waveguide film according to claim 14, wherein the principal surface is perpendicular to a thickness direction of the optical waveguide film main body.

* * * * *